Inventor:
WILLI LÖLIGER

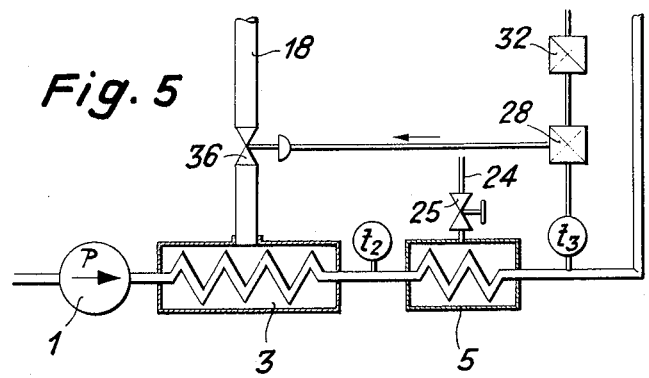
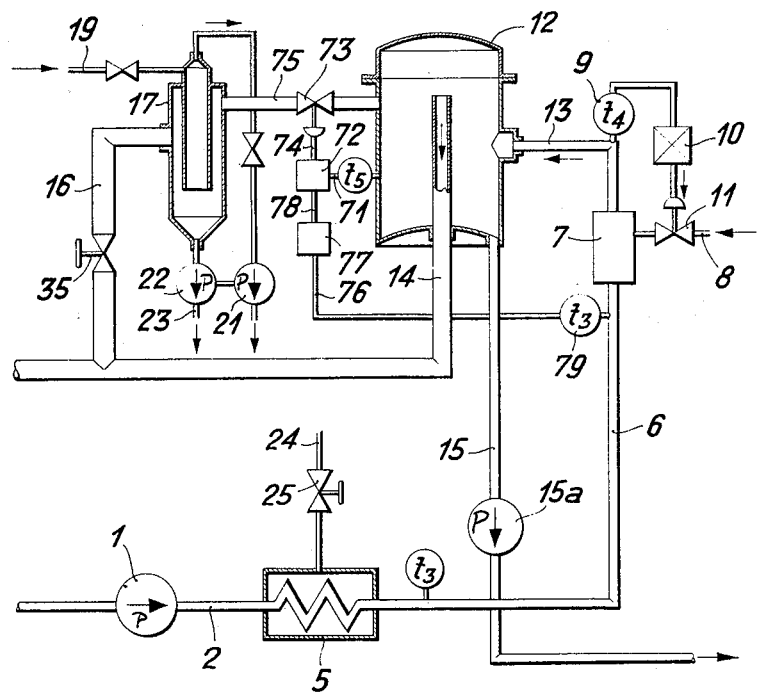

United States Patent Office 3,231,009
Patented Jan. 25, 1966

3,231,009
METHOD OF AND MEANS FOR OPERATING A PLANT WHEREIN A LIQUID IS HEATED BY THE ADMIXTURE OF STEAM
Willi Löliger, Konolfingen, Switzerland, assignor to Alpura AG, Bern, Switzerland, a corporation of Switzerland
Filed Apr. 23, 1963, Ser. No. 275,160
Claims priority, application Switzerland, Apr. 25, 1962, 4,984/62, 4,985/62
17 Claims. (Cl. 165—19)

The present application is a continuation-in-part of my copending application Serial No. 248,366, filed December 31, 1962, now Patent No. 3,150,713 granted September 29, 1964.

The present invention relates to a method of and an apparatus for operating plants wherein the liquid is heated by bringing it directly into contact with steam whereafter the liquid is cooled by expansion accompanied by partial evaporation, for example, for sterilizing the liquid. This treatment is particularly important for milk which is heated during a very short time which may be less than one second, to a temperature of, for example, 150° C. sufficient to destroy any germs, the immediately following cooling by expansion preventing any deterioration of the milk.

An object of the invention is to provide a method of and an apparatus for maintaining a predetermined relation between the specific gravities of a liquid entering and leaving a plant as set forth above.

In plants of the kind described, the water content of the liquid to be treated is changed twice. As a result of the contact with steam, vapor condenses in the liquid, whereas on the following expansion steam is released from the liquid. In some cases further variations in the water content may occur, namely if the liquid is subjected to degasification before heating, during which degasification gases dissolved in the liquid, or steam, may escape from the liquid as a result of reduction of the pressure, or if the first expansion is followed by one or more additional pressure reductions.

Depending upon the particular conditions, the control of the final specific gravity of the treated liquid, i.e., the concentration of the liquid, is an important requirement. When treating fresh milk intended for consumption, it is essential that the concentration of the treated milk, i.e., the ratio between the water content and the dry substance, has the same value as the concentration of the untreated milk. In other cases, a specific thickening or dilution may be required, i.e. the ratio between the specific gravity of the liquid entering the plant and the specific gravity of the liquid leaving the plant deviates from the value 1.

It is known to influence the final specific gravity of the treated liquid by regulating the temperature of the liquid immediately before the liquid is heated by the admixture of steam. For this purpose a device may be provided which is responsive to and regulates the temperature of the liquid by altering the amount of heat supplied to the liquid in an indirect heat exchanger before the liquid is heated by the admixture of steam. The preheat temperature of the liquid, i.e. the temperature of the liquid entering the sterilizing plant, is a measure for the thickening or dilution of the liquid leaving the plant. By maintaining a predetermined initial preheat temperature a desired ratio between the specific gravity of the liquid entering and leaving the sterilizing plant can be maintained, provided other conditions, such as heating by the admixture of steam and subsequent expansion, remain unchanged.

Conversely, the desired ratio between the specific gravities of the liquid entering and leaving the sterilizing plant can be controlled by regulating the expansion pressure or temperature of the liquid leaving the plant. This pressure or temperature is in fixed relation to the specific gravity. For this purpose the chamber wherein the liquid expands is connected by a pipe to a chamber wherein the pressure is lower than the expansion pressure of the liquid. The degree of opening of a valve in said pipe defines the expansion pressure and consequently the expansion temperature of the liquid. At otherwise constant conditions each expansion pressure or temperature corresponds to a definite ratio between the specific gravities of the liquid entering and leaving the plant. Deviations of said ratio from a desired ratio can be corrected by changing the degree of opening of the aforementioned valve.

It has been found that external conditions such as a change of factors influencing the expansion pressure or the initial temperature of the liquid may cause variations of the expansion temperature or pressure of the liquid, unless special means are provided for maintaining said factors at predetermined values. It has been found that the absolute values of the initial temperature and of the expansion temperature have a considerable influence on the specific gravity of the liquid leaving the plant, because the specific heat content of the steam admixed to the liquid is not equal to the specific heat content of the steam released from the liquid during expansion. The specific heat content of high pressure steam is greater than that of low pressure steam.

It is an object of the invention to provide a method and apparatus whereby a predetermined ratio between the specific gravities of a liquid entering and leaving a plant wherein the liquid is heated by the admixture of steam and subsequently cooled by expansion and partial evaporation, is maintained more accurately than by the aforedescribed conventional systems. With the method and apparatus according to the invention either the temperature of the liquid entering the plant or the temperature of the liquid leaving the plant is controlled whereby the control circuit for the controlled temperature receives a set point signal which corresponds in a predetermined manner to changes of the temperature which is not controlled.

In case the initial temperature of the liquid is the controlled temperature the aforesaid set point signal is preferably so adjusted in response to the uncontrolled expansion temperature that at increasing expansion temperature the increase of the initial temperature of the liquid is greater than the increase of the expansion temperature. The initial temperature is preferably controlled by controlling the supply of heat to the liquid in an indirect heat exchanger before steam is admixed to the liquid. If it is desired to control the temperature of the liquid leaving the plant, the expansion pressure of the liquid is preferably controlled.

An apparatus according to the invention includes means for continuously supplying the liquid to be treated to a plant for quickly heating the liquid by the admixture of steam and for subsequently expanding the liquid, means responsive to the temperature of the liquid before steam is admixed thereto and means responsive to the expansion temperature of the liquid, means operatively connected to one of said temperature responsive means for controlling the respective temperature, and means for producing a set point signal for said control means which signal is related in a predetermined manner to the uncontrolled temperatures. For this purpose the signals produced by the means responsive to the uncontrolled temperatures are fed into a memory or modifying device which modifies each temperature signal and emits a signal which is related to each uncontrolled temperature in a predetermined manner.

The means for controlling the temperature of the liquid prior to the admixture of steam preferably includes a heat exchanger which is preferably heated by steam released from the liquid during expansion thereof. It is advisable to provide at least one additional heat exchanger receiving heating steam or hot water from an extraneous source, the additional heat exchanger being placed downstream of the first heat exchanger with respect to the flow of the liquid. The steam supply to one of these heat exchangers is automatically controlled. While automatic control of steam or hot water supply to the second heat exchanger is feasible and within the realm of the invention, it has been found that control of the initial temperature of the liquid by regulating the hot water or steam supply to the second heat exchanger is sluggish and is not suitable for quickly adjusting the initial temperature of the liquid to suit changing conditions. This manner of controlling the initial temperature of the liquid is also uneconomical because extraneous steam must be continuously supplied to the second heat exchanger for regulating purposes, also at times when sufficient steam is available from the plant for producing the desired initial or preheat temperature in the first heat exchanger.

According to the invention the initial temperature of the liquid, i.e. the temperature of the liquid flowing from the second heat exchanger to the point where the liquid is mixed with steam, is controlled by automatically controlling the steam supply to the first heat exchanger and changing the opening of a valve controlling the steam or hot water supply to the second heat exchanger only when needed and retaining a minimum opening of the valve during the periods of time when the desired temperature control can be obtained by the control of the steam supply to the first heat exchanger.

Using at least a portion of the steam released from the liquid during expansion thereof for heating the liquid entering the plant affords a quick adjustment of the initial temperature to answer changed conditions because a change of supply of steam from the plant to the first heat exchanger automatically affects the expansion operation in a sense which assists the temperature control. It has been found that even if no hot water or steam is supplied to the second heat exchanger, the preheat temperature of the liquid can be satisfactorily automatically controlled by the control of the steam supply to the first heat exchanger.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 5 is a diagrammatic illustration of a portion of a modified control system of a plant as shown in FIG. 2.

FIG. 6 is a schematic illustration of a plant according to the invention for the treatment of raw milk wherein the temperature of the milk leaving the plant is controlled.

Figure 1:
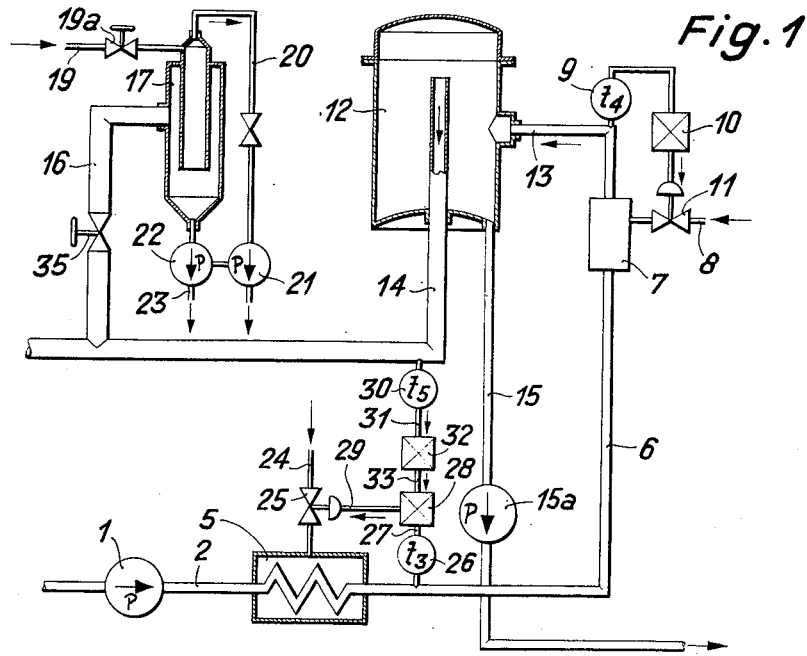
FIG. 1 is a schematic illustration of a plant according to the invention for the treatment of raw milk wherein the temperature of the milk entering an apparatus for heating the milk by the admixture of steam is controlled.

Referring more particularly to FIG. 1 of the drawing, numeral 1 designates a pump pumping the liquid to be treated, for example milk, at superatmospheric pressure through a pipe 2 into a preheater 5. The preheated liquid enters through a pipe 6 at a temperature $t_3$ a heating apparatus 7 wherein the milk is sterilized by quickly heating the milk by introducing steam into the milk. The steam is supplied by a source, not shown, through a pipe 8 into the heating apparatus 7 wherein the milk is heated, for example, to 150° C. A temperature responsive device 9 measures the temperature $t_4$ of the heated milk and produces a signal actuating a motor operator 10 which operates a valve 11 in the pipe 8. In this way the rate of flow of steam into the apparatus 7 is controlled to maintain a predetermined constant temperature $t_4$. The apparatus is preferably so adjusted that the steam condenses completely in the milk.

In order to prevent undesired changes of the milk due to the rather high temperature to which it is heated, the milk is cooled immediately after heating. Cooling is effected by a quick reduction of the pressure of the heated milk in an expansion chamber 12 which is connected by a pipe 13 to the heating apparatus 7. The pressure in the chamber 12 is below atmospheric pressure. Due to the abrupt pressure reduction a certain amount of water contained in the milk evaporates and the vapor is removed from the chamber 12 through a pipe 14.

The milk cooled to the temperature $t_5$ which is below the atmospheric boiling point of the milk, is pumped to the outside by a pump 15a through a pipe 15. The milk may be additionally cooled in a conventional plate-type cooler. Part of the vapor flowing through the pipe 14 is conducted through a pipe 16 into a condenser 17 while another part of the vapor may be conducted to a heat exchanger, not shown, for recuperating heat contained in the vapor. The pipe 16 is provided with a valve 35. The condenser 17 is in the form of an injection condenser, fresh water being injected through a pipe 19 provided with a valve 19a. For producing a suitable vacuum in the chamber 12 the condenser 17 is connected by a pipe 20 to a vacuum pump 21. A mixture of injection water and condensate is removed from the condenser by means of a condensate pump 22 through a pipe 23.

The preheater 5 is heated by a heat carrier, for example hot water or steam, supplied through a pipe 24 provided with a control valve 25.

In order to control the temperature $t_3$ of the preheated liquid entering the sterilizing apparatus a temperature feeler 26 is provided which produces a control signal which is conducted through a conduit 27 into a regulator 28. The latter produces a control signal which is responsive to deviations of the measured temperature $t_3$ from a desired set point value. The signal produced in the regulator 28 is conducted through a conduit 29 to the valve 25 for operating the valve. The aforesaid control circuit tends to open the valve 25 upon a decrease of the temperature $t_3$ below the desired value and tends to close the valve upon an increase of the temperature $t_3$ above the desired value.

According to the invention a set point signal corresponding to the desired temperature $t_3$ is supplied which signal is responsive in a predetermined manner to the expansion temperature $t_5$ of the treated liquid. For this purpose a temperature feeler 30 is provided which measures the expansion temperature, i.e., the temperature $t_5$ of the vapor in the pipe 14. This temperature is substantially equal to the temperature of the milk removed from the plant through the pipe 15.

The signal produced by the device 30 is conducted through a conduit 31 into a device 32. The latter includes means which will be described later and which coordinate the expansion temperatures $t_5$ in a predetermined ratio to the temperatures $t_3$ and produce a set point signal for the temperature $t_3$ to effect a desired ratio between the specific gravities of the liquid entering the sterilizing apparatus and of the liquid leaving the apparatus. The set point signal which corresponds to the desired value of the temperature $t_3$ for each temperature $t_5$ is conducted through a conduit 33 into the regulator 28.

The aforedescribed control circuit 26 to 29 maintains a temperature $t_3$ of the liquid entering the heating apparatus 7 which temperature is required in order to obtain a desired ratio between the specific gravity of the raw milk flowing through the pipe 6 and the specific gravity of the treated milk flowing through the pipe 15. The device 32 may be so constructed and arranged that the specific gravity of the liquid leaving the plant is equal to the specific gravity of the liquid entering the plant, i.e. that the liquid is neither permanently thickened nor diluted. The apparatus 32 may be so arranged that the specific gravity of the treated liquid differs to a predetermined degree from the specific gravity of the untreated liquid.

When treating milk an expansion temperature of 80° C. has been found suitable. The corresponding expansion pressure effects a satisfactory dissipation of undesired stable and fodder odors.

Figure 2:
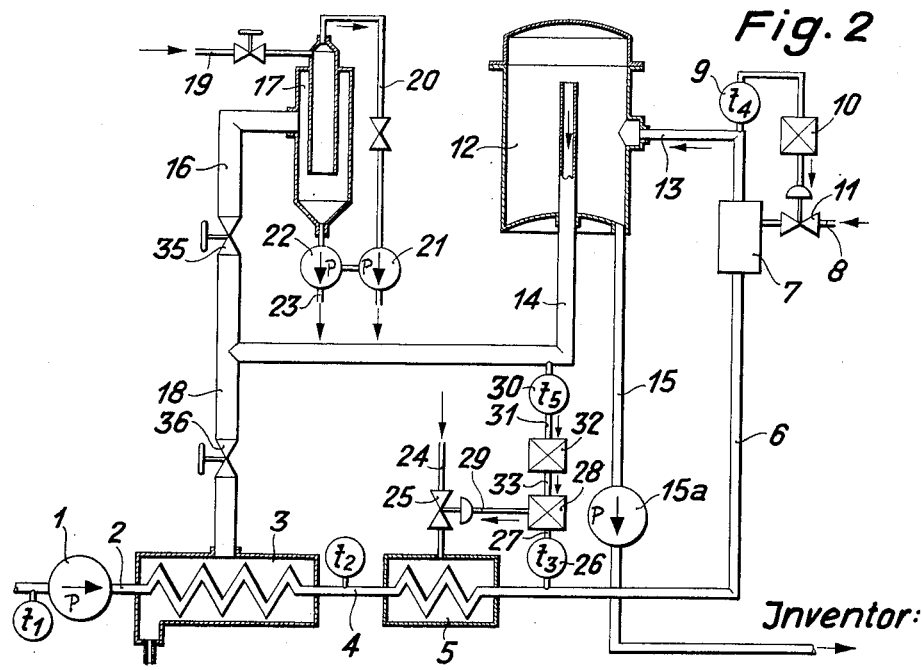
FIG. 2 is a schematic illustration of a plant of the type shown in FIG. 1 having an additional preheater for the liquid to be treated.

The plant shown in FIG. 2 is like the plant shown in FIG. 1 with a heat exchanger added for preheating the liquid to be treated by heat derived from the vapor produced in the plant. The vapor flowing through the pipe 14 is conducted through a pipe 18 as a heating medium into a surface heat exchanger 3. The liquid to be treated is conducted from the heat exchanger 3 through a pipe 4 into a heat exchanger 5 which is heated by a heat carrier supplied from an extraneous source of heat. The pipe 18 is provided with a valve 36 for adjusting the rate of flow of vapor to the preheater 3. The condensate produced in the preheater 3 is preferably conducted, by means not shown, through a water separator into the lower part of the condenser 17.

Figure 3:
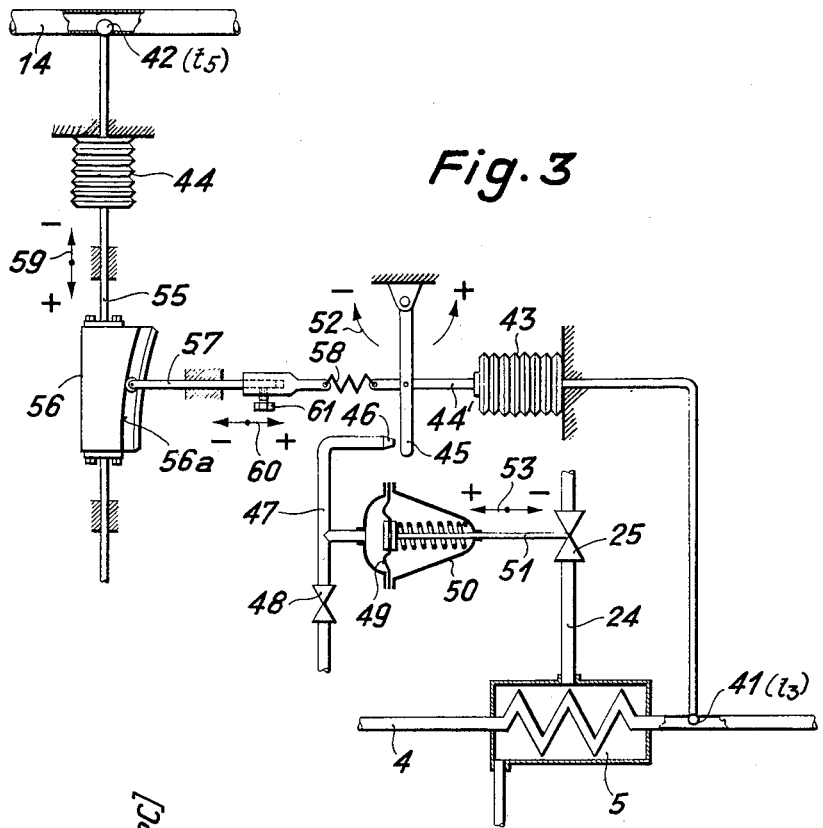
FIG. 3 is a diagrammatic illustration of control means forming part of the plants shown in FIGS. 1 and 2.

FIG. 3 diagrammatically illustrates a possible implementation of the control apparatus forming part of the arrangement shown in FIGURES 1 and 2. The temperatures $t_3$ and $t_5$ are measured by conventional temperature feelers 41 and 42, respectively, which are filled with a vaporizable liquid for producing a pressure in the bellows 43 and 44, respectively, which corresponds to the measured temperatures. Movement of the free end of the bellows 43 is transferred by means of a rod 44' to a lever 45 whose free end cooperates in the conventional manner with a nozzle 46 discharging a pressure fluid supplied through a pipe 47. The pressure in the pipe 47 corresponds to the distance of the free end of the lever 45 from the nozzle 46. The pipe 47 is connected to a source of pressure fluid, not shown, for example air, a valve 48 being interposed in the pipe 47. The pipe 47, downstream of the valve 48, is connected to a motor operator 50 provided with a diaphragm 49 on which the pressure in the pipe 47 acts against the action of a spring. A rod 51 is connected to the diaphragm 49 and to the valve 25 for actuating the latter in response to the pressure in the pipe 47.

Upon an increase of the temperature $t_3$ of the liquid to be treated the lever 45 moves in the minus direction of the arrow 52. This causes an increase of the pressure in the pipe 47 and movement of the rod 51 in the minus direction of the arrow 53 for closing the valve 25 and reducing the amount of heat carrier supplied to the heat exchanger 5, whereby the temperature $t_3$ is reduced to its desired value.

According to the invention the set point value for the aforedescribed control circuit is adjusted in response to the temperature $t_5$ at predetermined ratios to said temperature. The movement of the free end of the bellows 44 is transmitted through a rod 55 to a cam 56. The latter is provided with a cam groove 56a serving as a guide for a cam follower roller connected to one end of a rod 57. The latter is connected by way of a spring 58 to the lever 45. The position of the rod 57 determines in the conventional manner the set point value for the aforedescribed control circuit for controlling the temperature $t_3$. The cam 56 moves in the plus direction of the arrow 59 upon an increase of the temperature $t_5$. In this case the rod 57 is moved by the groove 56a in the plus direction of the arrow 60, effecting an increase of the set point for the temperature $t_3$. In this way a clearly defined new initial or preheat temperature is associated with the new expansion temperature.

The coordination of the expansion temperature of the treated liquid and its initial temperature prior to treatment for obtaining a predetermined ratio between the initial value and the end value of the specific gravity of the liquid is determined by the configuration of the groove in the cam 56.

Figure 4:
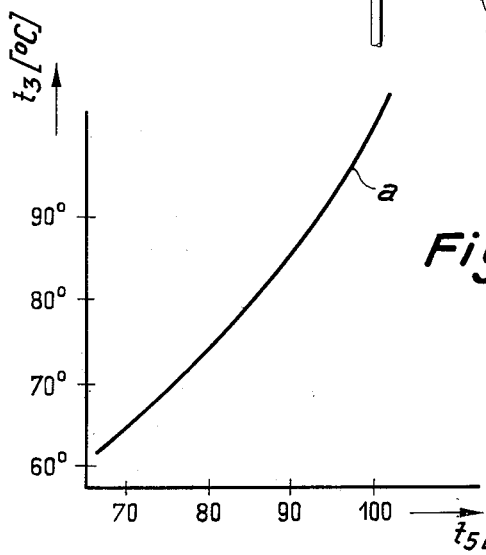
FIG. 4 is a graph showing the coordination of the temperatures of a liquid entering an apparatus for heating the liquid by the admixture of steam with the temperatures of the liquid leaving the apparatus.

FIG. 4 illustrates the relationship between initial temperature and expansion temperature in cases where the specific gravity of the untreated milk is equal to the specific gravity of the treated milk. The temperature $t_4$ of the heated milk before expansion is 150° C., and the graph is based on heating the milk by saturated steam having a temperature of 175° C. and a pressure of 9 kg./cm.$^2$. The curvature of the groove 56a may, for example, exactly correspond to that of the curve $a$ in FIG. 4.

If the relationship between the final specific gravity of the liquid and the initial specific gravity thereof is required to be other than unity, all that is required is to replace the cam or memory element by a different memory element having an appropriately shaped cam groove 56a. Often, it is sufficient just to alter the length of the rod 57. For this purpose the rod 57 is made in two parts and its length can be adjusted after loosening a set screw 61. This arrangement also facilitates initial adjustment of the control system.

Theoretically as well as practically the cam groove 56a adjusts the set point value for the temperature $t_3$ so that at increasing expansion temperature the initial temperature increases more than the expansion temperature and conversely. The curve $a$ in FIG. 4 does not consider heat losses in the treating apparatus. Consideration of the heat losses moves the curve $a$ in an upward direction. The curvature of the curve is caused by the different specific heat contents of steam at different pressures.

The invention effects a very accurate control of the ratio between the initial value and the final value of the specific gravity of the liquid. When treating milk and controlling the process so that the specific gravities of the untreated milk and of the treated milk are equal, it has been found that with the method and apparatus according to the invention the specific gravity of the treated milk deviates not more than ±0.2 per mil from the specific gravity of the untreated milk.

In lieu of the valve 25 in FIG. 2 the valve 36 which controls the supply of vapor from the chamber 12 to the preheater 3, or other suitable means for controlling heat transfer from said vapor to the liquid to be treated may be automatically actuated by the signal produced by the device 28. An arrangement of this type is illustrated in FIG. 5. In this case the valve 25 controlling the heat supply to the heat exchanger 5 is manually operated.

When treating milk which must neither be thickened nor thinned, the heat recovered in the preheater 3 from the vapor liberated in the chamber 12 is usually sufficient for maintaining a desired preheat temperature $t_3$, if the expansion temperature of the milk is approximately 80° C. and the heat exchange surfaces of the preheater 3 are not too small. The additional preheater 5 is needed only if, after prolonged operation, the heat exchanging surfaces in the preheater 3 are so fouled that the desired preheat temperature $t_3$ cannot be maintained. The arrangement according to FIG. 5 affords a more economical operation than the arrangement shown in FIG. 2 wherein, for regulating purposes, a certain minimum amount of live steam must be continuously supplied. The arrangement according to FIG. 5 also affords a quicker automatic control of disturbances because, whereas the effect of a change of supply of heating steam to the heat exchanger 3 is slow, the increase or decrease of the rate of flow of vapor to the heat exchanger immediately effects a change of the pressure in the expansion chamber 12 in a desired sense. Opening of the valve 36 effects a reduction of the expansion pressure or temperature $t_5$ which has the same influence on the specific gravity of the liquid leaving the plant as an increase of the preheat temperature $t_3$. Closing of the valve 36 causes increase of the temperature $t_5$ which has the same effect on the specific gravity of the liquid leaving the plant as a decrease of the temperature $t_3$.

In lieu of the system shown in FIG. 3 a system as shown in copending application Serial No. 248,366, filed December 31, 1962 may be used for adjusting the set point for the device 28. In this case a signal corresponding to the difference between the expansion temperature $t_5$ and the initial temperature $t_3$ is fed into the device 28 and the valve 36 is actuated accordingly. This difference is also a measure for the dilution or thickening of the treated liquid.

In the system according to FIGS. 2 and 5 the preheater 5 which is heated from an extraneous source of heat may be omitted. If a preheater heated by a heat carrier supplied from outside of the plant is provided, it is advisable to provide means for maintaining the temperature of the heat carrier at a constant value. If the heat carrier is saturated steam, its pressure may be maintained constant.

If the heat exchanger 3 is of ample size and its heat transfer surfaces are clean, it can produce the desired preheat temperature $t_3$ even if this temperature is close to the temperature $t_5$. In the case of milk which must leave the treating plant at the same specific gravity as that of the milk entering the plant, the temperature $t_3$, depending on the size of the plant and heat loss due to radiation, may be 77° C. and the temperature $t_5$ may be 80° C. An indicating or alarm device may be provided which comes into action when the heat exchange surfaces of the heat exchanger 3 become so fouled that the device 28 opens the valve 36 all the way and a heat carrier must be supplied to the preheater 5 in order to obtain the required preheat temperature $t_3$. Since such occasions are rare and the preheater 5 is not used most of the time the system according to FIG. 5 is very economical.

Figure 7:
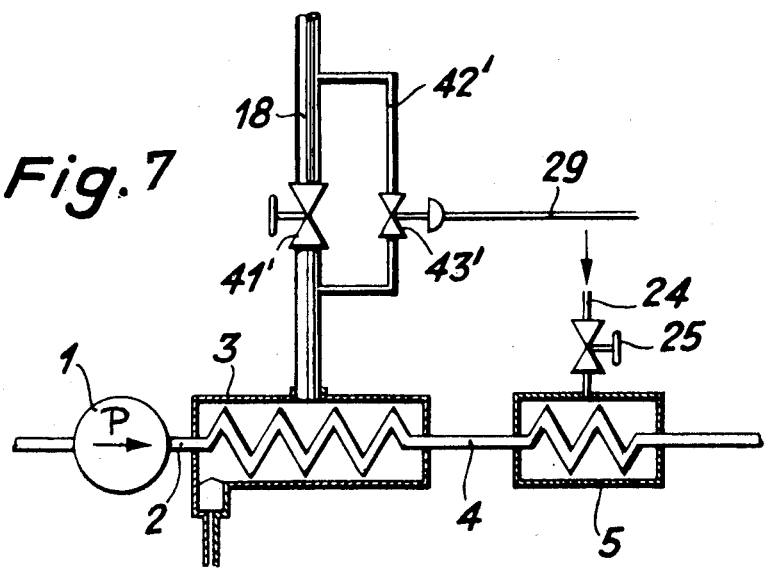
FIG. 7 is a diagrammatic illustration of a modification of the system shown in FIG. 5.

FIG. 7 shows a modification of the system shown in FIG. 5. In lieu of the automatically controlled valve 36 in FIG. 5 a throttle valve 41' or a throttling orifice and a by-pass pipe 42' conducting steam around the valve or throttling orifice are provided. A valve 43' is interposed in the by-pass pipe 42' and operatively connected by the conduit 29 to the device 28 to be automatically controlled thereby. The advantage of the arrangement shown in FIG. 7 is that the automatically controlled valve 43' may be considerably smaller than the valve 36 of the arrangement shown in FIG. 5.

The treating plant shown in FIG. 6 corresponds to that shown in FIG. 1. Whereas in the arrangements shown in FIGS. 1 to 5 the initial or preheat temperature $t_3$ is controlled, in the arrangement according to FIG. 6 the expansion temperature $t_5$ is controlled. A signal corresponding to the temperature $t_5$ is conducted into a regulator 72 through a conduit 71. The regulator 72 produces a signal corresponding to deviations of the temperature $t_5$ from a desired value, the signal being used for actuating a valve 73 which is connected to the regulator 72 by means of a conduit 74. The valve 73 is interposed in a pipe 75 connecting the steam space of the expansion chamber 12 to the condenser 17. The valve 73 is more or less open during normal operation of the plant and the system is so devised that the pressure in the condenser 17 is lower than the pressure in the chamber 12. Rising of the expansion temperature $t_5$ causes opening of the valve 73 and, consequently, a reduction of the expansion pressure and of the temperature $t_5$ to its desired value. Conversely, lowering of the temperature $t_5$ effects increase of the expansion pressure in the chamber 12.

According to the invention a set point signal is provided for the control circuit 71 to 74 for controlling the expansion temperature and pressure which set point signal corresponds in a predetermined relation to changes of the initial temperature $t_3$ which is not automatically controlled. A device 79 sensitive to the temperature $t_3$ is connected by conduit 76 to a memory device 77 which is capable of coordinating each temperature $t_5$ to each possible initial temperature $t_3$ in such manner that a desired ratio between the specific gravities of the liquid before and after treatment is obtained. A signal corresponding to the initial temperature $t_3$ and modified in the device 77 is conducted through a conduit 78 as set point value for the temperature $t_5$ into the control circuit controlling the temperature $t_5$. The elements 72 and 77 may be of the kind shown in FIG. 3. In the last described system the initial or preheat temperature $t_3$ of the liquid is not automatically controlled. The valve 25 in the pipe 24 for supplying a heat carrier to the preheater 5 is manually controlled.

In the system shown in FIG. 1 the set point value which is supplied to the control circuit for the initial temperature $t_3$ may be responsive to the expansion pressure in the chamber 12 since this pressure is rigidly related to the expansion temperature. In FIG. 3 the interior of pipe 14 may be directly connected to the interior of the bellows 44 since an increase of the expansion temperature is rigidly related to an increase of the expansion pressure.

In systems according to the present invention the expansion temperature may be replaced by the expansion pressure and instead of producing a control signal corresponding to the expansion temperature a control signal corresponding to the expansion pressure may be used. A control circuit may be provided which controls the expansion pressure, the control circuit receiving a set point signal corresponding to the preheat temperature $t_3$. This system is obtained by applying in the plant shown in FIG. 6 a signal corresponding to the expansion pressure to the regulator 72 in lieu of the signal corresponding to the temperature $t_5$.

For simplicity's sake proportionally operating control devices have been shown, although elements having a different time characteristic, for example proportional-integral regulators, may be used. In lieu of the illustrated pneumatic or hydraulic control devices mechanical or electric control devices may be used.

The invention is not limited to a process for disinfecting or sterilizing liquids. The invention is also applicable to processes where admixture of steam causes lower temperatures $t_4$ than those considered in this specification whereby only pathogenic germs are destructed, as in pasteurizing processes. The invention is not limited to treatment of a particular kind of liquid. Aside from the application to processes for treating milk, the invention may be used in combination with processes for treating fruit juices, pharmaceutical adjuvants, and the like. The invention is not limited to particular kinds of apparatus for admixing steam to the liquid to be treated, for example, the liquid may be sprayed into a steam atmosphere.

I claim:

1. A method of maintaining a predetermined relation between the specific gravities of a continuously flowing liquid entering and leaving an apparatus wherein said liquid is continuously heated by the admixture of steam and subsequently cooled by expansion and partial evaporation, comprising:

producing a control signal corresponding to the temperature of the liquid entering said apparatus, producing a control signal corresponding to the temperature of the liquid leaving said apparatus, modifying one of said signals in response to the second signal to decrease the first signal upon an increase of the second signal, and vice versa, and controlling one of said temperatures in response to the modified signal.

2. A method as defined in claim 1 comprising continuously increasing the second signal at a greater rate than the temperature to which said second signal corresponds increases, and conversely, and modifying the first signal in response to the increased and decreased second signal.

3. A method of maintaining a predetermined relation between the specific gravities of a continuously flowing liquid entering and leaving an apparatus wherein said liquid is continuously heated by the admixture of steam and subsequently cooled by expansion and partial evaporation, comprising:

producing a first control signal corresponding to the temperature of the liquid entering said apparatus, producing a second control signal corresponding to the temperature of the liquid leaving said apparatus, increasing and decreasing said second signal at a greater rate than the rate of increase and decrease of the temperature of the liquid leaving said apparatus for modifying said second signal, combining said modified second signal with said first control signal for reducing increase of the first signal and for increasing decrease of the first signal, upon an increase of the modified second signal, and conversely, and controlling the temperature of the liquid entering said apparatus in response to said combined signal for increasing the temperature of the liquid entering said apparatus upon an increase of the temperature leaving said apparatus and at a rate which is higher than the rate of increase of the temperature of the liquid leaving said apparatus.

4. A method of maintaining a predetermined relation between the specific gravities of a continuously flowing liquid entering and leaving an apparatus wherein said liquid is continuously heated by the admixture of steam and subsequently cooled by expansion and partial evaporation, comprising:

producing a first control signal corresponding to the temperature of the liquid entering said apparatus, producing a second control signal corresponding to the temperature of the liquid leaving said apparatus, modifying said first signal in response to said second signal for decreasing said first signal upon an increase of the second signal, and conversely, supplying heat to the liquid before the liquid enters said apparatus, and adjusting said heat supply to the liquid in response to said modified first signal for increasing the heat supply upon a decrease of said modified first signal, and conversely.

5. A method of maintaining a predetermined relation between the specific gravities of a continuously flowing liquid entering and leaving an apparatus wherein said liquid is continuously heated by the admixture of steam and subsequently cooled by expansion and partial evaporation, comprising:

producing a first control signal corresponding to the temperature of the liquid entering said apparatus, producing a second control signal corresponding to the temperature of the expanded liquid, modifying said second signal in response to said first signal for decreasing said second signal upon an increase of the first signal, and conversely, and adjusting the expansion pressure of the liquid in response to said modified second signal for decreasing the expansion pressure upon a decrease of the modified second signal, and conversely.

6. A method of maintaining a predetermined relation between the specific gravities of a continuously flowing liquid entering and leaving an apparatus wherein said liquid is continuously heated by the admixture of steam and subsequently cooled by expansion and partial evaporation, comprising:

producing a first control signal corresponding to the temperature of the liquid entering said apparatus, producing a second control signal corresponding to the temperature of the liquid leaving said apparatus, combining said signals for decreasing said first signal upon an increase of the second signal, and conversely, indirectly heating the liquid in a heat exchanger before the liquid enters said apparatus, supplying vapor resulting from said partial evaporation as heating agent to said heat exchanger, and controlling the vapor supply to said heat exchanger in response to said combined signal for increasing vapor supply upon a decrease of said combined signal, and conversely.

7. A method as defined in claim 6, comprising supplementally indirectly heating the liquid before the liquid enters said apparatus in a second heat exchanger arranged downstream of said first mentioned heat exchanger with respect to the flow of said liquid, supplying an extraneous heating fluid to the second heat exchanger, and effecting supply of said heating fluid to said second heat exchanger upon insufficient availability of vapor for heating the fluid in the first mentioned heat exchanger.

8. In combination with an apparatus wherein a continuously flowing liquid is continuously heated by the admixture of steam and subsequently cooled by expansion and partial evaporation:

regulating means for maintaining a predetermined relation between the specific gravities of the liquid entering the apparatus and of the liquid leaving the apparatus, said regulating means comprising:

means producing a signal corresponding to the temperature of the liquid entering said apparatus, means producing a signal corresponding to the temperature of the liquid leaving said apparatus, means for altering one of said temperatures, control means operatively connected to said means for altering one of said temperatures, said control means being operatively connected to said means producing a signal corresponding to the temperature which is altered, for actuation thereby, said means producing a signal corresponding to the temperature which is not altered being operatively connected to said means producing a signal corresponding to the temperature which is altered, for adjusting said last mentioned signal in response to the signal corresponding to the temperature which is not altered for decreasing the signal corresponding to the temperature which is altered, when the signal corresponding to the temperature which is not altered increases, and conversely, and means operatively interposed between said signal producing means for increasing the signal corresponding to the temperature which is not altered at a greater rate than the temperature which is not altered increases, and conversely, for coordinating at predetermined ratios the temperatures which are altered with the temperatures which are not altered.

9. In combination with an apparatus wherein a continuously flowing liquid is continuously heated by the admixture of steam and subsequently cooled by expansion and partial evaporation:
  regulating means for maintaining a predetermined relation between the specific gravities of the liquid entering the apparatus and of the liquid leaving the apparatus, said regulating means comprising:
  first means producing a signal corresponding to the temperature of the liquid entering said apparatus,
  second means producing a signal corresponding to the temperature of the liquid leaving said apparatus,
  at least one heat exchanger interposed in the path of the liquid prior to entering said apparatus,
  means for altering the heat transferred to the liquid in said heat exchanger,
  control means for said last mentioned means,
  said control means being operatively connected to said first signal producing means for actuation thereby,
  said second signal producing means being operatively connected to said first signal producing means for adjusting the signal produced by said first signal producing means in response to the signal produced by said second signal producing means for decreasing the signal corresponding to the temperature of the liquid entering the apparatus, when the signal corresponding to the temperature of the liquid leaving the apparatus increases, and conversely, and
  means operatively interposed between said signal producing means for increasing the signals produced by said second signal producing means at a greater rate than the temperature of the liquid leaving the apparatus increases, and conversely, for coordinating at predetermined ratios the temperatures of the liquid entering the apparatus with the temperatures of the liquid leaving the apparatus.

10. In the combination defined in claim 9 and wherein at least one heat exchanger is connected to said apparatus for receiving heating vapor resulting from the partial evaporation during expansion of the heated liquid.

11. In the combination defined in claim 9 and wherein at least one heat exchanger receives heat from an extraneous source of heat.

12. In the combination defined in claim 9 and wherein one heat exchanger is connected to said apparatus for receiving heating vapor resulting from the partial evaporation during expansion of the heated liquid and a second heat exchanger is heated from an extraneous source of heat, said control means being operatively connected to said second heat exchanger for controlling heating thereof.

13. In the combination defined in claim 9 and wherein one heat exchanger receives heating vapor resulting from the partial evaporation during expansion of the heated liquid and a second heat exchanger is heated from an extraneous source of heat, said control means being operatively connected to said first heat exchanger for controlling supply of heating steam thereto.

14. In combination with an apparatus wherein a continuously flowing liquid is continuously heated by the admixture of steam and is subsequently cooled by expansion and partial evaporation in an expansion chamber:
  regulating means for maintaining a predetermined ratio between the specific gravities of the liquid entering and leaving the apparatus, said regulating means comprising:
  first means producing a signal corresponding to the temperature of the liquid entering said apparatus,
  second means producing a signal corresponding to the temperature of the liquid leaving said apparatus,
  means for altering the expansion pressure of the liquid for altering the temperature of the liquid leaving the apparatus,
  control means for said last mentioned means,
  said second signal producing means being connected to said control means for actuating the latter,
  said first signal producing means being operatively connected to said second signal producing means for modifying the signals produced by said second signal producing means in response to the signals produced by said first signal producing means for decreasing the signals produced by said first signal producing means when the signals produced by the second signal producing means increase, and conversely, and
  means operatively interposed between said signal producing means for increasing the signals produced by said second signal producing means at a greater rate than the temperature of the liquid leaving the apparatus increases, and conversely, for coordinating at predetermined ratios the temperatures of the liquid entering the apparatus with the temperatures of the liquid leaving the apparatus.

15. In the combination defined in claim 14 wherein said means for altering the expansion pressure of the liquid includes a chamber wherein a relatively low pressure is maintained, a pipe connecting said expansion chamber to said low pressure chamber, and a valve in said pipe, said valve being operatively connected to said control means for actuation thereby.

16. In combination with an apparatus wherein a continuously flowing liquid is continuously heated by the admixture of steam and is subsequently cooled by expansion and partial evaporation in an expansion chamber:
  regulating means for maintaining a predetermined ratio between the specific gravities of the liquid entering and leaving the apparatus, said regulating means comprising:
  a first heat exchanger interposed in the path of the liquid prior to entering said apparatus,
  a second heat exchanger interposed in the path of the liquid between said first heat exchanger and said apparatus,
  a pipe connecting said first heat exchanger to said expansion chamber for conducting vapor therefrom as a heating agent to said first heat exchanger,
  an automatically operable valve interposed in said pipe,
  an inlet for a heating fluid connected to said second heat exchanger,
  a nonautomatic valve interposed in said inlet,
  means producing a first signal corresponding to the temperature of the liquid entering the apparatus,
  means producing a second signal corresponding to the temperature of the liquid leaving the apparatus, and
  means for combining said signals for decreasing the first signal when the second signal is increased, and conversely,
  said combining means being operatively connected to said automatically operable valve for opening said valve and increasing vapor supply to said first heat exchanger when the combined signal decreases, and conversely.

17. In combination with an apparatus wherein a continuously flowing liquid is continuously heated by the admixture of steam and is subsequently cooled by expansion and partial evaporation in an expansion chamber:
  regulating means for maintaining a predetermined ratio between the specific gravities of the liquid entering and leaving the apparatus, said regulating means comprising:
  a heat exchanger interposed in the path of the liquid prior to entering said apparatus,
  a conduit connecting said heat exchanger to said expansion chamber for conducting vapor therefrom as a heating agent to said heat exchanger,
  throttling means interposed in said conduit,
  a by-pass pipe connected to said conduit for conducting vapor around said throttling means,
  a valve interposed in said by-pass pipe,
  means producing a first signal corresponding to the temperature of the liquid entering the apparatus, means producing a second signal corresponding to the temperature of the liquid leaving the apparatus, and means for combining said signals for decreasing the first signal when the second signal is increased, and conversely, said combining means being operatively connected to said valve in said by-pass pipe for opening said valve and increasing vapor supply to said first heat exchanger when the combined signal decreases, and conversely.

References Cited by the Examiner

UNITED STATES PATENTS 3,010,832  11/1961  Dahlstedt _____ 165—66 X
3,041,958  7/1962   Abrams et al. _____ 99—251
3,101,041  8/1963   Hallstrom _____ 99—251

FOREIGN PATENTS 802,338  10/1958  Great Britain.

JAMES W. WESTHAVER, *Primary Examiner.*